No. 640,569. Patented Jan. 2, 1900.
J. JORGENSON.
NUT LOCK.
(Application filed Aug. 9, 1899.)
(No Model.)

Witnesses,

Inventor,
John Jorgenson

UNITED STATES PATENT OFFICE.

JOHN JORGENSON, OF SAN FRANCISCO, CALIFORNIA.

NUT-LOCK.

SPECIFICATION forming part of Letters Patent No. 640,569, dated January 2, 1900.

Application filed August 9, 1899. Serial No. 726,687. (No model.)

*To all whom it may concern:*

Be it known that I, JOHN JORGENSON, a citizen of the United States, residing in the city and county of San Francisco, State of California, have invented an Improvement in Nut-Locks; and I hereby declare the following to be a full, clear, and exact description of the same.

My invention relates to a device for locking nuts upon the ends of axles of vehicles or shafts or for other like purposes It consists in the combination, with a nut, of a stem slidable in an opening parallel with the axis of the nut and exterior to the threaded opening, said stem having a point projecting into the line of travel of the shaft, so as to engage a notch or notches in the end of the shaft when the nut is seated and a spring by which the locking is maintained.

The invention comprises details of construction which will be more fully explained by reference to the accompanying drawings, in which—

Figure 1:
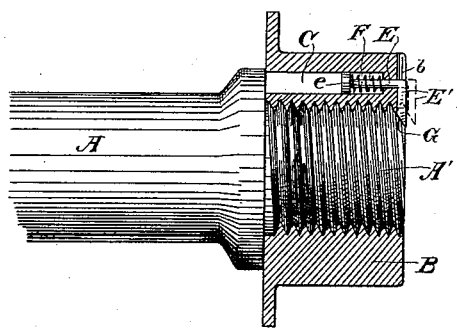
Figure 3:
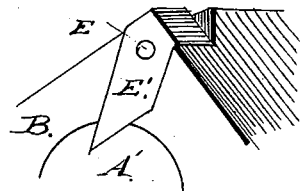
Figure 2:
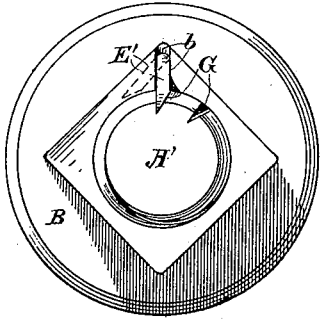

Figure 1 is a section through the nut, showing the lock. Fig. 2 is a face view of the same. Fig. 3 is a modification to be referred to.

The object of this invention is to provide a locking device for nuts which are used upon vehicle axles, shafts, or bolts and under such conditions that the nuts fit upon the end of the shafts or bolts, where it is necessary to prevent their turning off or becoming loosened, while at the same time they may be easily disengaged when desired to move the nut.

As here illustrated, A is a shaft having a screw-threaded end A', and B is a nut adapted to screw upon this end. Within the body of the nut and parallel with the screw-threaded opening is a hole or chamber C, within which is slidable a shank or stem E, having upon its lower end a head or enlargement $e$. The opening within which the stem is movable is of a diameter sufficient to receive the head $e$ and also a spring F, which surrounds the stem, one end pressing against the head and the other against the opposite end of the opening in which the stem moves, the opening being contracted at this point so as to be only the diameter of the stem, which passes out through the end to the outside of the nut. At this point the stem is bent at right angles, so as to form a projecting arm E'. This arm extends through a slot or channel $b$, made between the screw-threaded opening of the nut and the hole through which the stem E passes, and the part E' projects into the line of travel of the bolt. The end of this arm E' is beveled or cut off angularly, so that when the bolt begins to appear near the outer end of the nut it will easily pass the arm E' and at the same time push the arm outward within its slot until the nut has become seated. At this point a notch G is made in the end of the bolt corresponding in shape with the end of the arm E', and when this notch has arrived opposite the arm the tension of the spring surrounding the stem will cause the arm to fall into the notch in the end of the bolt, and thus lock the nut and bolt together to prevent their being separated.

The rear of the arm E' may terminate in line with the pin E, or it may extend outwardly to the edge of the nut, as shown in Fig. 3, having in either case a notch made in some part which could be engaged by any implement to raise the stem and the arm E' until the latter is disengaged from the notch in the bolt, when the nut can be turned off.

It will be understood that as many of the notches G may be made in the bolt-head as may be desired, so that if in turning the nut it has a tendency to turn farther than the first one the arm E' will fall into the next one, and so on, thus compensating for any wear or change in the position of the parts by use.

The pin and spring within the nut are entirely inclosed by closing the hole in the face of the nut after the parts have been put together, and as the arm E' is normally sunk into the groove or channel in which it lies it will not be exposed to damage by rough usage.

Having thus described my invention, what I claim as new, and desire to secure by Letters Patent, is—

1. In a nut-locking device, a nut having a radial groove made straight across its face from one outer edge to its central opening, a hole made at one side and parallel with the threaded opening thereof, a spring-pressed stem mounted in said opening and an arm directly on the end of the stem and extending at right angles thereto directly and straight across the face of the nut radial to the center of the opening thereof and lying within said groove, and having a beveled point lying interior to the wall of the opening in the nut and adapted to engage a notch in the screw to lock the parts after the nut has been seated.

2. In a nut-lock, a spindle or bolt having one or more notches formed in the outer end, a nut threaded to screw upon the end of the bolt having a groove made in one side from one outer edge to the central opening and extending straight across the face of the nut radial to the axis of the bolt, a hole extending through the nut parallel with the bolt and connecting with the outer end of the groove, a spring-pressed pin slidable in said hole having an arm bent at right angles and pointing directly toward the axis of the bolt, and resting in the groove on the end of the nut, and projecting into the path of the bolt so as to engage a notch therein when the nut has been seated, said arm having a projection at the outer end occupying the portion of the groove above the pin, said nut having a notch whereby the arm may be raised to disengage it from the bolt when the nut is to be removed.

In witness whereof I have hereunto set my hand.

JOHN JORGENSON.

Witnesses:
S. H. NOURSE,
JESSIE C. BRODIE.